United States Patent
Virtue

[15] 3,653,681
[45] Apr. 4, 1972

[54] BABY STROLLER

[72] Inventor: Julian A. Virtue, 2 Bowie Road, Rolling Hills, Calif. 90274

[22] Filed: May 19, 1970

[21] Appl. No.: 38,837

[52] U.S. Cl. ............................................................ 280/36 B
[51] Int. Cl. ..................................................... B62b 11/00
[58] Field of Search ............................. 280/36 B, 36 R, 41 A

[56] References Cited

FOREIGN PATENTS OR APPLICATIONS

| 1,227,557 | 3/1960 | France | 280/36 B |
| 508,489 | 7/1920 | France | 280/36 B |
| 265,716 | 9/1962 | Australia | 280/36 B |

*Primary Examiner*—Benjamin Hersh
*Assistant Examiner*—Robert R. Song
*Attorney*—Whann and McManigal

[57] ABSTRACT

A baby stroller having as an integral part of its structural framework a shock absorbing mechanism to cushion the ride of the infant passenger, and having a foldable frame for ease of storage or transport which includes an improved safety latching system to prevent accidental folding.

8 Claims, 8 Drawing Figures

INVENTOR
JULIAN A. VIRTUE
BY WHANN & McMANIGAL
Attorneys for Applicant

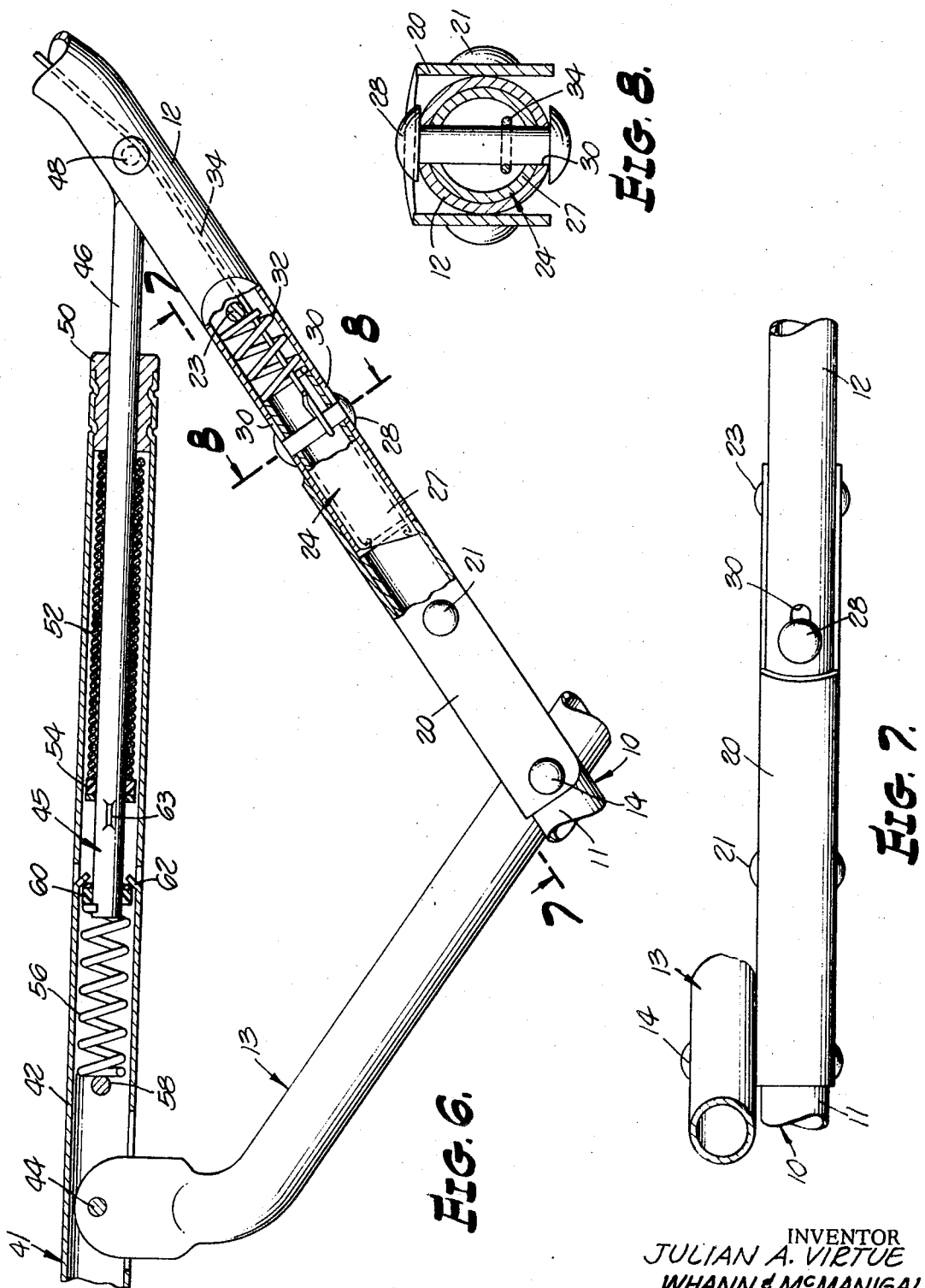

BABY STROLLER

BACKGROUND OF THE INVENTION

This invention relates to vehicles for babies or small children and more particularly to foldable baby strollers of an improved design having a compact and efficient shock absorbing system and an improved safety latching system to prevent accidental folding of the stroller.

Prior to this invention various types of foldable baby strollers have been developed. Many of these strollers provide no shock absorbing mechanisms whatsoever to cushion the infant's ride. Others use only conventional shock absorbing devices in conjunction with wheels or axles. Use of such devices tends to increase the cost, unwieldiness of operation and complexity of manufacture of the stroller. Additionally, latching systems used in many of the foldable strollers developed to date prove to be cumbersome to operate and often fail to include adequate safety features to effectively ensure against accidental folding of the stroller and possible consequential injury to the infant passenger.

SUMMARY OF THE INVENTION

This invention involves an improved type of baby stroller or other vehicle of the type for wheeling babies about which is easy to handle, can readily and safely be folded and expanded, and which provides a cushioned ride for the comfort and well being of the infant passenger.

A principal object of this invention is to provide a baby stroller which has as an integral part of its structural framework a shock absorbing means which effectively cushions the ride of the infant passenger, thereby adding to its safety and comfort.

Another object is to provide a baby stroller having a structural framework consisting of pivotally connected crossing frame means which are operatively connected by a shock absorbing means adapted to cushion shock forces tending to separate the ends of the crossing frame means.

A further object is to provide a baby stroller having a structural framework consisting of pivotally connected crossing frame means and an arm rest member operatively connected to the frame members which carries a shock absorbing means having spring assemblies adapted to urge separation of the ends of the frame means.

Still another object is to provide a baby stroller having pivotally connected crossing frame means wherein one frame means comprises a frame element and a foldable handle to allow folding of the stroller for storage or transport.

A further object is to provide a baby stroller having an improved safety latching means carried by the foldable handle and comprising latching assemblies and operatively associated hand operated latch release assemblies.

Another object is to provide a baby stroller having a significant safety feature in the form of an improved safety latching means that prevents the accidental collapse of the stroller, but at the same time allows safe, easy and efficient folding of the stroller for storage or transport.

Still another object is to provide a baby stroller which can be readily fabricated and easily assembled.

BRIEF DESCRIPTION OF THE DRAWINGS

It is believed the invention will be better understood from the following drawings, in which:

FIG. 6 is an enlarged fragmentary view of a portion of the stroller similar to that shown in FIG. 4 partly broken away to show further the internal construction of the shock absorber means;

FIG. 7 is a cross section taken generally along lines 7—7 of FIG. 6 illustrating the latching mechanism in a locked position; and FIG. 8 is a cross section taken generally along lines 8—8 of FIG. 6 illustrating the internal construction of the safety latching system.

DESCRIPTION OF THE PREFERRED EMBODIMENTS

Figure 1:
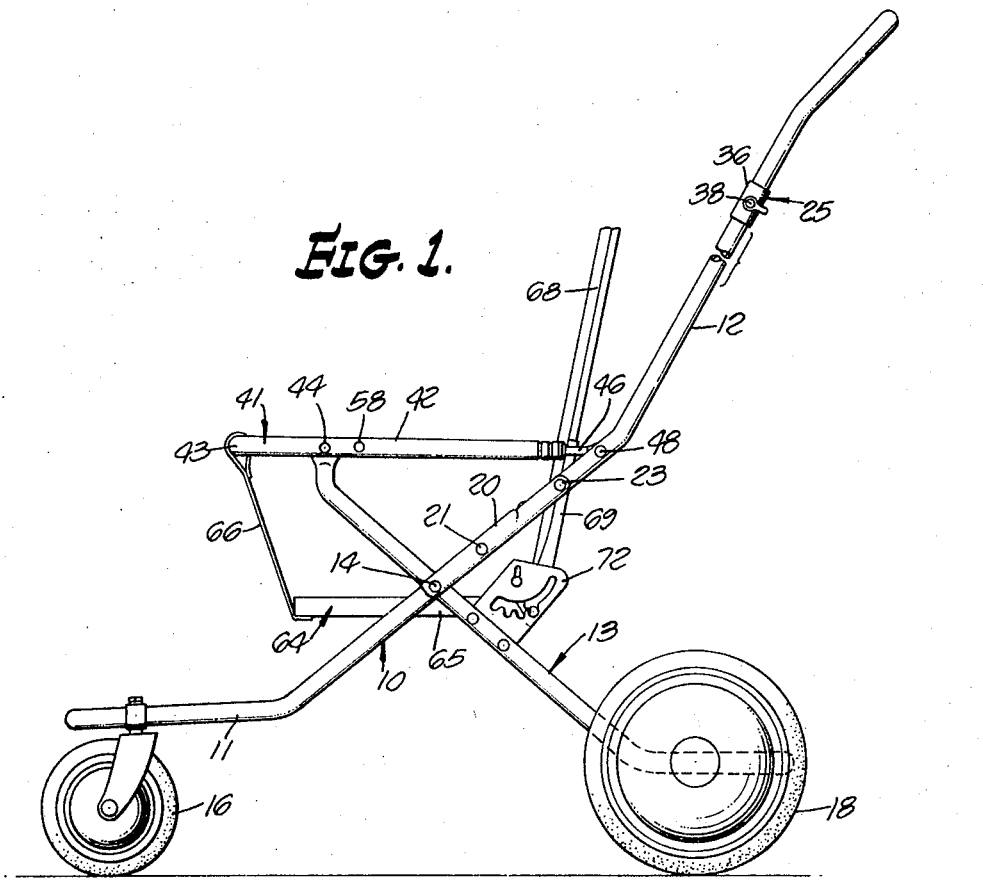
FIG. 1 is a side elevation of a stroller embodying this invention.
Figure 2:
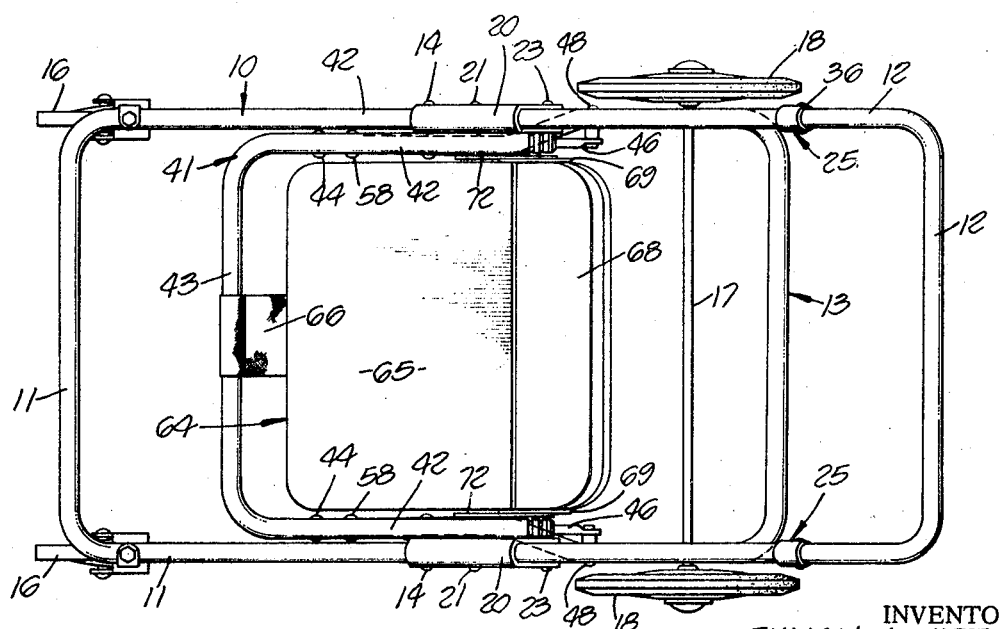
FIG. 2 is a top plan view of the stroller.

Referring to FIG. 1, it can be seen that the basic structural elements of the baby stroller consist of a first frame means 10 which comprises frame element 11 and foldable handle 12, and a second frame means 13. The first frame means 10 is in crossing relationship with and pivotally connected to the second frame means 13 by a pair of rivets 14. In the preferred mode of my invention frame means 11, foldable handle 12 and second frame means 13 are U-shaped each comprising a pair of side portions and a cross portion, and are of tubular construction. Numerals 16 and 18 designate ground engaging means shown as wheels attached to the lower ends of the first and second frame means. Caster type wheels 16 are shown to be provided near the forward end of the first frame means 10 and, as illustrated in FIG. 2, the side portions of second frame means 13 are apertured to receive a shaft 17 on which ground engaging rear wheels 18 are rotatably mounted.

Figure 3:
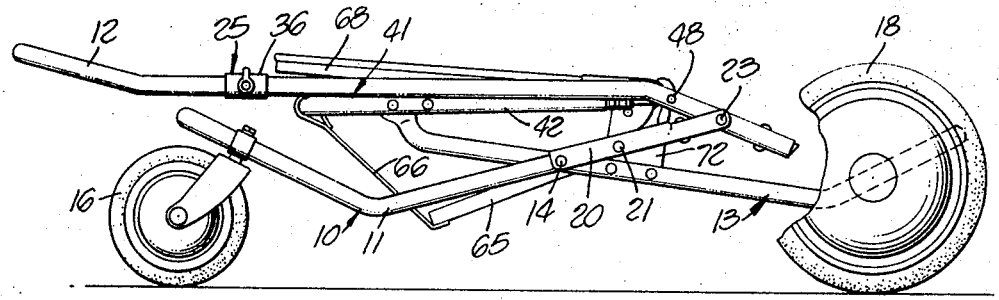
FIG. 3 is a side elevation of the stroller as collapsed for storage.
Figure 4:
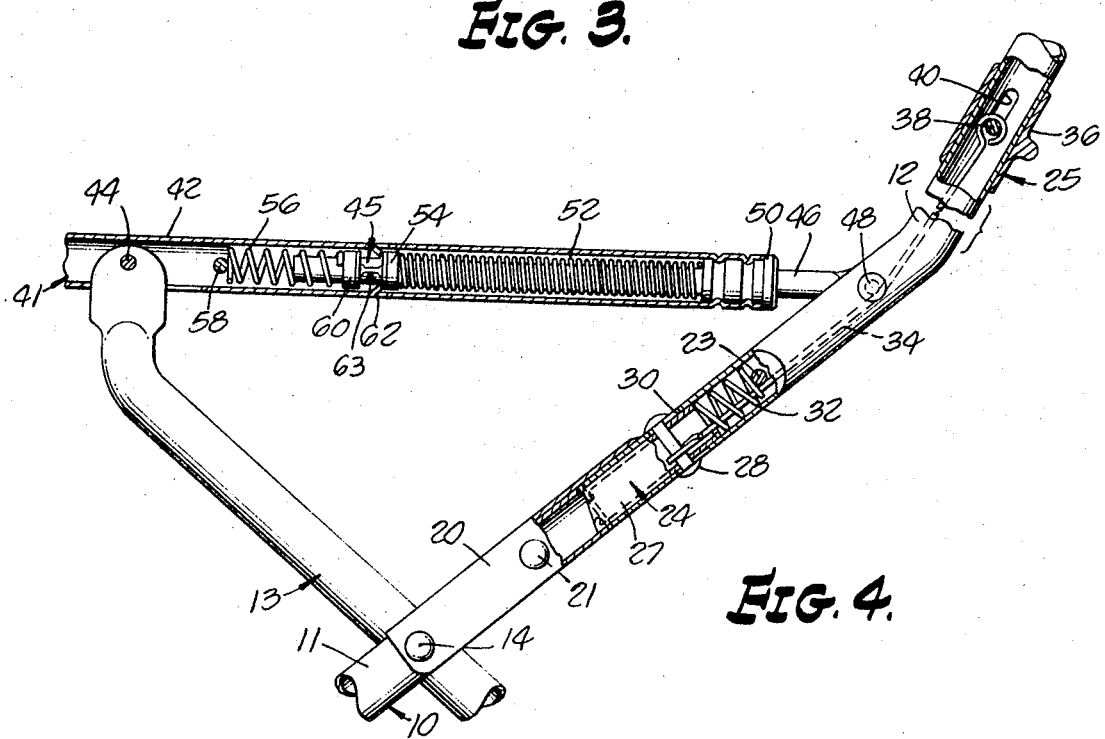
FIG. 4 is an enlarged fragmentary view of a portion of the stroller as shown in FIG. 1 partly broken away to show internal construction of the shock absorbing means.
Figure 5:
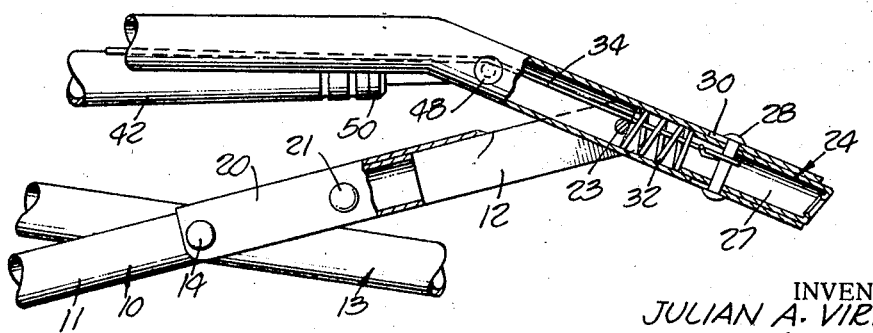
FIG. 5 is an enlarged fragmentary view of a portion of the stroller as shown in FIG. 3 partly broken away to show internal construction and to illustrate the operation of the safety latching system.

As shown in FIGS. 4 and 7, the upper ends of frame element 11 have channel shaped brackets 20, open at the bottom and partially cut away at the top, affixed thereto by rivets 14 and 21. Foldable handle 12 is pivotally connected near its ends to the sides of brackets 20 by rivets 23. As can be seen in FIG. 4, when foldable handle 12 is in its extended position its ends bear against the tops of brackets 20, thereby placing its sides in axial alignment with the sides of frame element 11. As shown in FIGS. 3 and 5, the construction of the brackets allows foldable handle 12 to be swung forward about the axis of rivets 23 into the folded position illustrated.

FIGS. 4 through 7 illustrate a safety latching means which prevents the stroller from being inadvertently folded. The latching means consists of a latching assembly 24 and a hand operated latch release assembly 25 integral to each side of foldable handle 12. Referring to FIG. 4, the construction of one of the latching assemblies may be seen. It includes a tubular latching plunger 27 tapered at one end to facilitate locking with the first frame means, and secured in internal telescopic association with one side of foldable handle 12 by rivet 28. FIG. 7 illustrates that foldable handle 12 has slots 30 in its side walls which provide a guide in which rivet 28 is free to move longitudinally, thereby allowing limited telescopic movement of the latching plunger within the foldable handle 12. Coil spring 32 also serves to force rivet 28 against the downward most limit of slots 30, which in turn positions the latching plunger so that its tapered end protrudes from the end of the foldable handle 12 by an amount equal to the width of the taper. It can be seen from FIG. 4 that, when the latching plunger 27 is in this normally extended position and when foldable handle 12 is in its extended operable position, the tapered end of the plunger protrudes into frame element 11 of the first frame means 10, serving to prevent rotation of foldable handle 12 into a folded position.

As may be seen in FIGS. 4 and 8, a control wire 34 is attached at one end to rivet 28, transverse upwardly through the interior of the latching plunger 27, spring 32 and the foldable handle 12 terminating at the hand operated latch release assembly 25 to which its other end is secured. Latch release assembly 25 is located at a height convenient for hand operation by the operator of the stroller, and consists of split pistol grip elements 36 held in slidable engagement between fixed limits with the sides of foldable handle 12 by a rivet 38 which passes through longitudinal slots 40 in the side walls of foldable handle 12. As shown in FIG. 4, slots 40 provide a guide in which rivet 38 may move longitudinally when the pistol grip elements are urged upward. The operation of the safety latching means will be apparent from the previous discussion and the drawings. To fold the stroller into its folded position, the stroller operator must simultaneously pull the pistol grips of latch release assemblies 25 upward with a force sufficient to compress coil springs 32. This upward movement places the control wires 34 under tension, urging rivets 28 upward in guide slots 30 and causing plungers 27 to telescope into foldable handle 12. When plungers 27 telescope into foldable handle 12 an amount equal to the width of the tapered end thereof, thereby completely disengaging it from frame element 11 of first frame means 10, foldable handle 12 may be pivoted out of its extended position into its folded position. Since to fold the stroller the operator must overtly exert force simultaneously on both of the pistol grip elements, accidental collapse of the stroller is highly unlikely. To position the stroller into an operable position, foldable handle 12 is swung upward toward the rear of the stroller until the tapered end of the latching plungers contacts the upper ends of frame element 11, compresses spring 32, and snaps into engagement with foldable handle 12.

FIGS. 2, 4 and 6 illustrate a shock absorber means for the stroller which includes a tubular U-shaped arm rest member 41 comprising a pair of side portions 42 and a front cross portion 43 pivotally connected at its side portion to the upper ends of second frame means 13 by a pair of pins 44. A spring means 45 for yieldably resisting the separation of the upper and lower ends of the first and second frame means is carried by the side portions of the arm rest member 41 and includes connecting rods 46 which are pivotally connected at one end to foldable handles 12 by rivets 48. Tube end bushings 50 are crimped in place at the end of arm rest members 41 and provide a rear guide for telescopic movement of the connecting rods into and out of the ends of side portions 42 of arm rest members 41. First coil springs 52 are positioned over connecting rods 46 and are held captive between tube end bushings 50 and first front guide bushings 54 which are carried by connecting rods 46. Second coil springs 56 are disposed within side portions 42 of tubular arm rest members 41 and are held captive therewithin between second front guide bushings 60, which are carried by connecting rods 46 and are slidably axially thereon within fixed limits, and stop pins 58. Stop pins 58 extend transversely of side portions 42 and are located so as to cause second coil springs 56 to resist forward movement (to the left as viewed in FIG. 4) of second guide bushings 60 within side portions 42.

Referring to FIGS. 4 and 6, FIG. 4 shows the relative position of the parts of the shock absorbing means of the invention when the stroller is at rest without the weight of an infant passenger thereon. FIG. 6 shows the relative position of the elements of the shock absorbing means when the upper and lower ends of the first and second frame means have been fully separated. As illustrated in FIG. 4, with the stroller at rest, connecting rods 46 are fully telescoped into the arm rest members with bushings 54 held in engagement with detents 62 which are formed in the walls of side portions 42 and extend inwardly in a manner so as to provide a forward stop for engagement with bushings 54 for limiting the inward travel of rods 46. In the position of the elements as shown in FIG. 4 with the stroller at rest, springs 56 are adapted to urge second guide bushings 60 rearwardly onto rods 46 into engagement with stops 63 which are provided on rods 46 in the form of axially extending spline-like protrusions which extend radially outward from the periphery of the connecting rods near the forward ends thereof. When the stroller is placed under load due to the infant passenger being seated therein, forces will be generated which tend to force apart the upper and lower ends of the first and second frame members causing the cooperating elements of the stroller to move toward the relative positions illustrated in FIG. 6. As shown in FIG. 6, when the stroller is placed under load, the scissor action between the first and second frame means will urge connecting rods 46 to telescope outwardly from within side portions 41. As the connecting rods move outwardly bushing 54, due to the urging of stops 63, will engage springs 52 causing them to be compressed against bushings 50. It is this compression of springs 52 which provides a cushioning effect to the infant passenger by dampening shock forces which may be encountered which tend to urge separation of the upper and lower ends of the frame means.

When the forces tending to separate the frame means are released, as for example when the infant is removed from the stroller, springs 52 will urge rods 46 to telescope inwardly toward the position shown in FIG. 4. To prevent damaging the parts, this inward movement of rods 46 is dampened by the resistive forces offered by springs 56 which are compressed between stop pins 58 and bushings 60 as the rods telescope into side portions 42.

To provide a cushioning effect to the infant passenger during the operation of the stroller, springs 52 are constructed so that the weight of the average infant will cause them to be only partially compressed. In this way, when the stroller is in use, shock forces experienced by the wheels due to unevenness in the running surface tending to separate the frame means will be cushioned by the further compression of spring 52 until the point is reached at which the spring is fully compressed as illustrated in FIG. 6.

Referring again to FIGS. 1 and 2, a seat 65 is suspended at its front edge from arm member 41 by a cloth strip 66 which folds over arm rest member 41 and is attached securely to the front underside of seat 65. A back rest 68 is pivotally connected to seat 65 and carries support brackets 69 affixed to back rest 68. Frame brackets 72 are mounted upon each side portion of second frame means 13 for operative engagement with support brackets 69 so that seat back 68 may be adjusted into various positions from vertical to horizontal. In this manner a foldable baby stroller is formed which will safely accommodate an infant passenger while seated, lying down or in an intermediate position, and which will cushion the ride of the infant passenger when the stroller is propelled in normal fashion.

While specific embodiments of the invention have been shown and described, the invention is not limited to the particular constructions disclosed. Accordingly, it is intended that all modifications which fall within the true scope of the invention be included in the appended claims.

I claim:
1. A vehicle which comprises:
   a. a first frame means comprising a frame element and a foldable handle pivotally connected to the upper portion thereof;
   b. a second frame means pivotally connected to said first frame means in a crossing relationship;
   c. a plurality of ground engaging means attached to the lower ends of said frame means; and
   d. shock absorber means pivotally connected at one end thereof to said foldable handle of said first frame means above said pivotal connection of said frame element and said handle and at the other end thereof to the upper portion of said second frame means so as to cushion shock forces tending to separate the lower ends of said first and second frame means and to enable said vehicle to be folded for storage.

2. A vehicle in accordance with claim 1 wherein said shock absorber means comprises:
   a. an arm rest member pivotally connected near the upper end of said second frame means; and
   b. spring means operatively connecting said arm rest member and said foldable handle of said first frame means so as to yieldably resist separation of the upper ends of said first and second frame means.

3. A vehicle in accordance with claim 2 wherein said spring means comprises:
 a. at least one connecting rod pivotally connected at one end to said foldable handle of said first frame means and in telescopic association at the other end with said arm rest member; and
 b. at least one spring assembly operatively connecting said connecting rod and said arm rest member tending to yieldably resist the telescoping of said connecting rod out of said arm rest member.

4. A vehicle in accordance with claim 3 including spring means tending to yieldably resist the telescoping of said connecting rod into said arm rest member.

5. A vehicle in accordance with claim 9 wherein said frame element and said foldable handle are operatively connected by a latching means for latching and unlatching said foldable handle, said latching means comprising:
 a. at least one latching assembly operatively connecting said frame element and said foldable handle so as to position said foldable handle in a normally extended position; and
 b. at least one hand operated latch release assembly attached to said foldable handle and in operative association with said latching assemblies to unlatch said foldable handle so as to allow it to be pivoted out of its extended position.

6. A vehicle which comprises:
 a. a first and second frame means connected together in a crossing relationship;
 b. a plurality of ground engaging means attached to the lower ends of said frame means;
 c. an arm rest member pivotally connected near the upper end of said second frame means;
 d. at least one connecting rod pivotally connected at one end to said first frame means and in telescopic association at the other end with said arm rest member; and
 e. at least one spring means housed within said arm rest member adapted to yieldably resist the telescoping of said connecting rod out of said arm rest member.

7. A vehicle in accordance with claim 6 including a spring carried by said arm rest member and adapted to urge against telescopic movement of said connecting rod into said arm rest member.

8. A vehicle in accordance with claim 6 wherein said first frame comprises a frame element and a foldable handle and includes:
 a. at least one latching assembly operatively connecting said frame element and said foldable handle so as to position said foldable handle in a normally extended position; and
 b. at least one hand operated latch release assembly attached to said foldable handle and in operative association with said latching assemblies to unlatch said foldable handle so as to allow it to be pivoted out of its extended position.

* * * * *